United States Patent [19]

Fjeldsend, Jr.

[11] Patent Number: 4,707,255

[45] Date of Patent: Nov. 17, 1987

[54] APPARATUS FOR MAGNETIC TREATMENT OF FLOWING LIQUID

[75] Inventor: Olaf Fjeldsend, Jr., Sandefjord, Norway

[73] Assignee: Olaf Fjeldsend A/S, Sandefjord, Norway

[21] Appl. No.: 912,055

[22] Filed: Sep. 26, 1986

[30] Foreign Application Priority Data

Jul. 29, 1986 [NO] Norway ................... 863064

[51] Int. Cl.$^4$ .......... B03C 1/02; C02F 1/48; B01D 35/06
[52] U.S. Cl. .................. 210/222; 209/232; 209/223.1
[58] Field of Search ......... 210/222, 223, 695; 55/100; 209/223 R, 232

[56] References Cited

U.S. PATENT DOCUMENTS

| | | | |
|---|---|---|---|
| 3,941,700 | 3/1976 | Sundt | 210/223 |
| 4,390,423 | 6/1983 | Sundt | 210/222 |
| 4,422,935 | 12/1983 | Mattingly | 210/222 R |

FOREIGN PATENT DOCUMENTS

| | | | |
|---|---|---|---|
| 1089500 | 9/1960 | Fed. Rep. of Germany | 210/222 |
| 111291 | 8/1967 | Norway . | |
| 131006 | 12/1974 | Norway . | |
| 145209 | 10/1979 | Norway . | |

Primary Examiner—Richard V. Fisher
Assistant Examiner—W. Gary Jones
Attorney, Agent, or Firm—Watson, Cole, Grindle & Watson

[57] ABSTRACT

Apparatus for the magnetic treatment of a flowing liquid, comprising a housing (1) and an annular permanent magnet (4) having radially oriented pole shoes (5, 6). Within the cylindrical space of the magnet and coaxially thereto a ferromagnetic cup member (7) is provided, which is in magnetic communication with one of the pole shoes and has slots or apertures (8) in the walls to permit the passage of liquid. The cup member (7) is provided with a radially extending collar (10) which together with the other pole shoe (6) form a magnetic field gap (11) through which the liquid shall flow. The collar (10) is part of a cap (9) adapted to be moved axially with respect to the cup member (7) to adjust the width of the magnetic field gap and thus the magnetic influence on the liquid.

3 Claims, 1 Drawing Figure

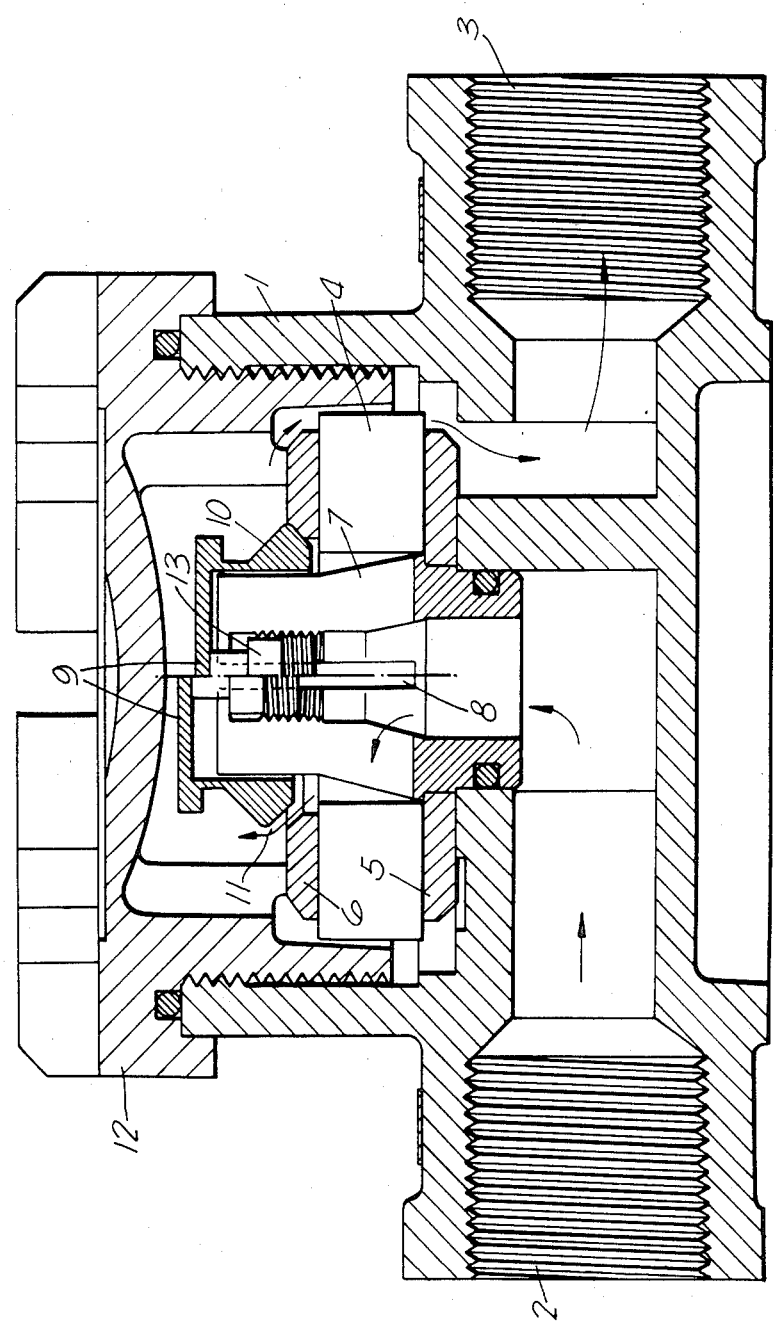

APPARATUS FOR MAGNETIC TREATMENT OF FLOWING LIQUID

The present invention relates to an apparatus for the magnetic treatment of a flowing liquid such as water, for the purpose of preventing scale formation caused by precipitation of matter which is dissolved in the liquid and also of preventing the corrosive effect of the liquid on the conduits and the service apparatus contacted by the liquid.

Such magnetic treatment of liquids, and apparatus to effect such treatment are previously known, e.g. from the Norwegian Pat. No. 111.291, and U.S. Pat. Nos. 3,941,700 and 4,390,423, and are of particular interest for the treatment of water of the type which is apt to cause calciferous precipitations of boiler scale type or which is apt to cause corrosion.

Apparatus for effecting such treatment of a flowing liquid comprises a housing through which the liquid flows and in which is located a permanent magnet in such a manner that the liquid flows through a magnetic field gap formed partially by one pole shoe of the magnet. More particularly, the invention concerns such an apparatus which comprises a housing through which the liquid flows and at least one annular permanent magnet having radially oriented pole shoes, the permanent magnet being mounted in the housing in such a manner that the liquid flows from an inlet through the inner cylindrical space of the magnet and through a magnetic field gap formed partially by one pole shoe of the magnet. The characteristics of the apparatus of the invention is that it comprises a substantially cylindrical ferro-magnetic cup member mounted in the inner cylindrical space of the magnet and coaxially thereto, in magnetic communication with the second pole shoe of the magnet, the cup member being provided with slots or apertures in the walls for passage of the liquid and with a ferro-magnetic radially extending collar which together with the first pole shoe form the magnetic field gap. In a further embodiment of the invention, the collar is made as part of a cap member adapted to be moved axially relative to the cup member for adjusting the width of the magnetic field gap and thus adjusting the magnetic influence, in agreement with the flow rate and/or the physical characteristics of the flowing liquid.

The invention will be described in detail with reference to the accompanying drawing, showing a section through a preferred embodiment.

The drawing shows a housing of plastics or other non-magnetic material, in the form of a cylindrical cup 1, the axis of which extends substantially at right angles to the inlet 2 and the outlet 3 of the housing. The inlet 2 extends to a central opening in the bottom of the cup 1, while the outlet 3 is in communication with an excentric opening in the bottom of the cup. Within the cup 1 and coaxially thereto an annular permanent magnet 4 is provided, which has radially oriented lower and upper pole shoes 5 and 6. Within the cylindrical space in the magnet 4 and coaxially thereto a substantially cylindrical cup member 7 of ferro-magnetic material is provided. This cup member 7 is in conductive connection with the lower pole shoe 5, the lower open end of the cup member 7 is in communication with the inlet, and the walls and optionally even the bottom of the cup member are slotted or apertured at 8 to permit passage of liquid. At the upper closed end of the cup member 7 a cap 9 is provided having a radially extending collar 10 which through the cup member 7 is in magnetic communication with the lower pole shoe 5 and which together with the upper pole shoe 6 form a magnetic field gap 11 through which the liquid flows after having passed through the slots or apertures 8 in the cup member 7. From the gap 11 the liquid flows on the outside of the permanent magnet 4 to the outlet 3. The housing cup 1 is closed at the upper end by means of a lid or cap 12, e.g. a screw cap.

The cup member 7 and the cap 9 with the collar 10 are made in two separate parts to permit the removal of the cap and collar unit for cleaning of the surface of the magnetic field gap.

In the preferred embodiment as shown, the cap and collar unit is adapted to be moved axially with respect to the cup member 7 by means of a screw 13. Thereby, the width of the magnetic field gap may be adjusted in a simple manner at the place where the apparatus is to be used, in agreement with local parameters (type of liquid to be treated, liquid hardness, liquid quantity) in the system in which the apparatus is to be mounted. In the drawing, the cap 9 is shown to the right of the center line in a lower position providing a narrow magnetic field gap, and to the left of the center line in a higher position providing a wider magnetic field gap.

I claim:

1. In an apparatus for magnetic treatment of a flowing liquid, comprising a housing (1) through which the liquid shall flow, and at least one annular permanent magnet (4) having radially extending pole shoes (5, 6), the permanent magnet being mounted in the housing in such a manner that the liquid will flow from an inlet (2) through the cylindrical space of the magnet (4) and through a magnetic field gap (11) formed partially with one (6) of the magnet pole shoes, the improvement comprising a substantially cylindrical cup member (7) disposed within the cylindrical space of the magnet and coaxially thereto, in magnetic connection with the other magnet pole shoe (5), said cup member (7) being provided with openings (8) in its walls and being provided with a radially extending collar (10) of ferro-magnetic material, said collar forming, together with said one pole shoe (6) said magnetic field gap (11) and means for adjusting said magnetic field gap in which the collar (10) is axially movable relative to the cup member (7).

2. Apparatus according to claim 1 in which the collar (10) is part of a cap (9).

3. Apparatus according to claim 2, further comprising a lid (12) connected to said housing and overlying said cap (9).

* * * * *